No. 895,233.

J. BEUC.
ROTARY ENGINE.
APPLICATION FILED FEB. 10, 1908.

PATENTED AUG. 4, 1908.

No. 895,233. PATENTED AUG. 4, 1908.
J. BEUC.
ROTARY ENGINE.
APPLICATION FILED FEB. 10, 1908.

Witnesses

Inventor
Jacob Beuc
by Hopkins & Eicks, Attys.

No. 895,233. PATENTED AUG. 4, 1908.
J. BEUC.
ROTARY ENGINE.
APPLICATION FILED FEB. 10, 1908.

Witnesses
W. C. Stin

Inventor
Jacob Beuc
by Hopkins & Eicks. Attys.

No. 895,233. PATENTED AUG. 4, 1908.
J. BEUC.
ROTARY ENGINE.
APPLICATION FILED FEB. 10, 1908.

Witnesses
H. C. Stein

Inventor
Jacob Beuc
by Hopkins & Eicks, Attys.

No. 895,233.

J. BEUC.
ROTARY ENGINE.
APPLICATION FILED FEB. 10, 1908.

PATENTED AUG. 4, 1908.

UNITED STATES PATENT OFFICE.

JACOB BEUC, OF ST. LOUIS, MISSOURI.

ROTARY ENGINE.

No. 895,233.   Specification of Letters Patent.   Patented Aug. 4, 1908.

Application filed February 10, 1908. Serial No. 415,450.

*To all whom it may concern:*

Be it known that I, JACOB BEUC, a citizen of the United States, and resident of St. Louis, Missouri, have invented certain new and useful Improvements in Rotary Engines, of which the following is a specification.

This invention relates to improvements in rotary engines, and consists in the novel arrangement, construction and combination of parts as will be fully hereinafter described and claimed.

The object of my invention is to construct a rotary engine provided with a mechanism whereby the movement can be readily reversed.

A further object of my invention is to construct a rotary engine, having two cylinders, the piston being so located in the cylinders as to provide a steady and continuous movement to the revolving parts, a mechanism whereby the movement can be reversed, and a governor mechanism whereby the speed is regulated.

In the construction of my invention, I provide a suitable base 16, on which is mounted a pair of cylinders 17 and 18, each cylinder being arranged in halves and securely retained together by the cap screws or bolts 19.

In the inner surface of each section of the cylinders is formed a semi-circular recess 20, which forms a circular passage 21, when both of said sections are placed together, this circular passage 21 forms the cylinder in which the pistons 22 operate, and the periphery of the pistons is provided with suitable packing 23, which closely contact with the entire inner surface of the passage 21; thus preventing leakage.

The pistons 22 are supported on a disk 24, said disk rigidly held in position upon the driving shaft 25, which shaft extends through the inner engine and on the ends of said shaft are located the driving pulleys 26.

The inner surface of each section of the cylinders is recessed as indicated by the numeral 27, the ends of said recess formed at an angle as indicated by the numeral 28, and in said recesses are located packing rings 29, so arranged as to fit closely with the tapered surface of the recess, and disk 24, which carry the pistons, thus forming a perfect leakproof connection.

In the upper end of the cylinders and in each section forming the same, are slots 30 in which operate sliding abutments 31, each being pivotally connected at the point indicated by the numeral 32 between the prongs 33 of the bifurcated levers 34, the said levers 34 pivotally mounted in the bracket 35 attached to the outer surfaces of the sections, forming the cylinders 17.

The opposite ends of the bifurcated levers 34 are provided with rollers 36, which are designed to contact with the surface 37 of the cams 38, and are operated to withdraw the sliding abutments 31 when the projecting portion 39 of the cams 38 come in contact with said rollers, and when released the abutments 31 are moved inwardly, closing the passage 21 by means of the springs 40.

The cams 38 are rigidly mounted upon the driving shaft 25, on each side of the cylinders. On the cams 38 located upon the driving shaft between the two cylinders are attached cam disks 41, each having a pair of cam projections 42, with which is designed to come in contact the rollers 43 carried in the bifurcated end 44 of the shifting connecting rods 45, and the shafts 46 on which the rollers 43 are mounted are adapted to operate in elongated slots 47 in the valve operating lever 48. The shifting of the rollers 43 is to accommodate the proper operation of the valve at a proper period, depending upon the direction of the operation of the engine.

On the shaft 25 is mounted a bevel gear 49 which meshes with a bevel pinion 50, carried by the governor rod 51, and said pinion is held in alinement by means of a pin 52 formed on a collar 53 loosely mounted upon the shaft 24, and the said governor rod 51 has free movement on the pin 52 by means of the bore 54, and the collar 53 is prevented from moving laterally by means of the set collar 55.

On the outer end of the governor rod 51 are attached in the usual manner a set of governor balls 56, which are connected to a sliding sleeve 57 to which is attached one end of the rocking levers 58, which are supported upon the cross-bar 59, by the supports 60.

The opposite ends of the rocking levers are bifurcated as indicated by the numeral 61, and in each prong forming the bifurcation, is located an elongated slot 62 in which are located and permitted to operate trunnions 63 formed on the collar 64, in which is held one end of the governor valve rod 65. The portion of the governor valve rod passing through the collar 64 is threaded, and on said rod and on each side of the collar are nuts 66, which are for the purpose to adjust the movement of said valve rods. The said valve rods 65 pass downwardly through the caps 67 located on top of the steam chests 68, and in said steam chests 68 are formed passages 69, in which the valves 70 operate. The said valves being attached to the lower end of the valve rods 65.

The steam chests 68 are provided with inlet ports 71, through which the steam is admitted in the passages 69, from the steam supply pipe 72. The steam chests 68 are held in rigid position upon the top of the cylinders, and through said steam chest is provided a bore 73, in which is located a revolving valve 74, having a port 75 which is arranged to communicate with the ports 76 and 77, formed in the chest above and below the bore 73, which will permit the steam to pass from the passages 69 into the recess 78 formed in the bottom of the steam chests and located directly above the port 79 formed in the top of the cylinder, in this port is located a revolving valve 80 which is provided with a port 81 through which the steam is admitted into the passage 21 formed in the cylinder by way of the ports 82 and 83. In the cylinders are also provided bores 84 in which are seated rotary valves 85 and 86, each provided with a port 87, which when properly set are brought in alinement with the ports 88 formed in the cylinder and communicating with the ports 82 and 83 and with ports 89, which discharge in the pipes 90, located on the outside of the cylinders and pass around the same, discharging into the exhaust port 91, located in the bottom of the cylinders, the said exhaust port 91 communicating with a recess 92 formed in the cylinder beneath the passage 21.

The valve 74 is operated by the valve operating lever 48, its upper slotted end 93, communicating with a lever 94, the one end of said lever being pivotally connected at the point indicated by the numeral 95, upon a post 96. The said lever 94 is also connected to one end of a crank arm 97, which is attached to the end of the valve stem 98, which forms a part of the valve 74.

Figure 6:
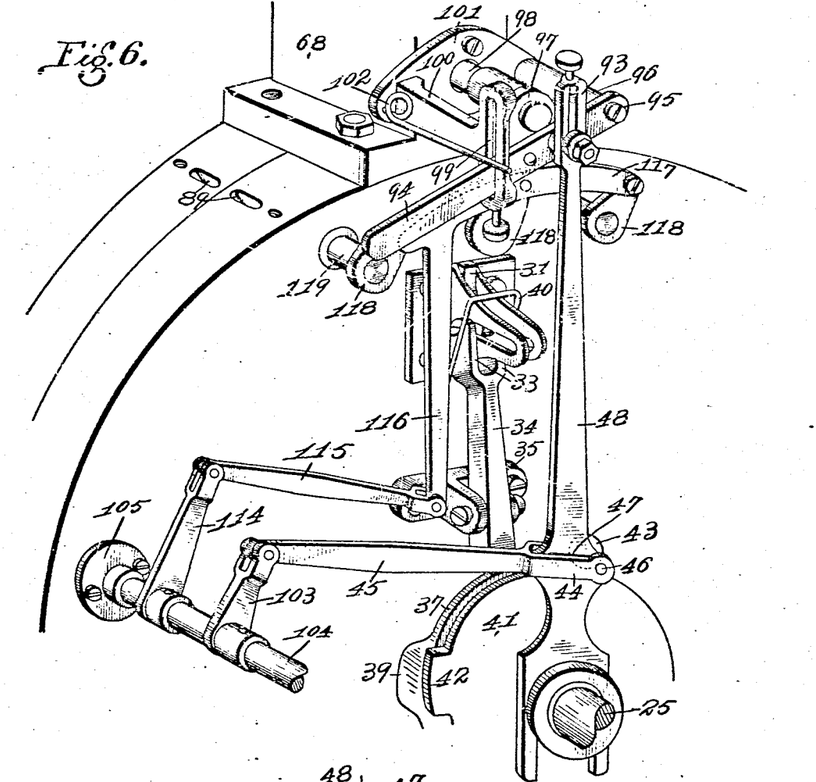
Fig. 6 is a detail perspective view of the valve operating mechanism and the reversing mechanism carried by the cylinder by which the movement of the engine is governed.

The lever 94 is guided in a slot 99 formed in a bracket 100, which is attached to and carried by a plate 101, which is rigidly attached to the one side of the steam chest, see Fig. 6, and to said plate is also attached the post 96 to which the end of the lever 94 is attached. To the plate 101 is also attached a spring 102, the outer end of said spring contacting with the lever 94, and its tendency is to force the arm downward, keeping the roller 43 in contact with the periphery of the cam 41. The valve operating lever 48 has its lower end bifurcated and arranged to fit over the shaft 25, so as to retain the valve operating lever in a perpendicular position.

The rocking or rotary movement of the valve 74 is governed by the location of the roller 43, the position of the roller 43 depending upon the direction in which the engine is running, and this position of the roller 43 is governed by the manipulation of the shifting connecting rods 45, the opposite ends of the rods 45 are connected to an arm 103 which is mounted upon a shaft 104, this shaft extends from cylinder to cylinder and is supported in bearings 105, attached to the cylinders and said shaft is operated by the lever 106.

Figure 7:
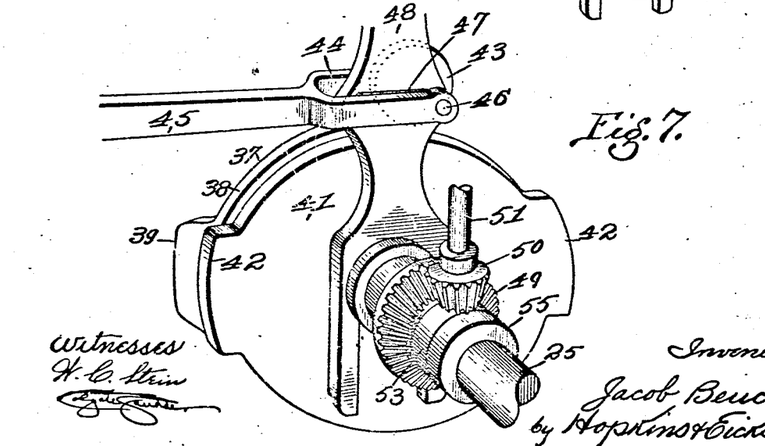
Fig. 7 is a detail perspective view of the cams, a portion of the valve operating arm and the gears by which the governor mechanism is operated.
Figure 8:
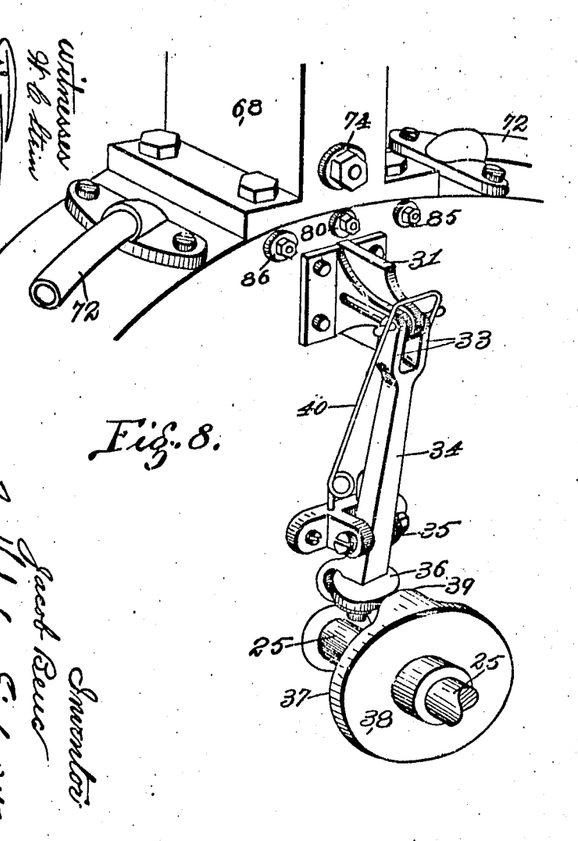
Fig. 8 is a detail perspective view of a portion of the cylinder, showing the arrangement and location of the sliding abutments and the mechanism for operating the same.
Figure 9:
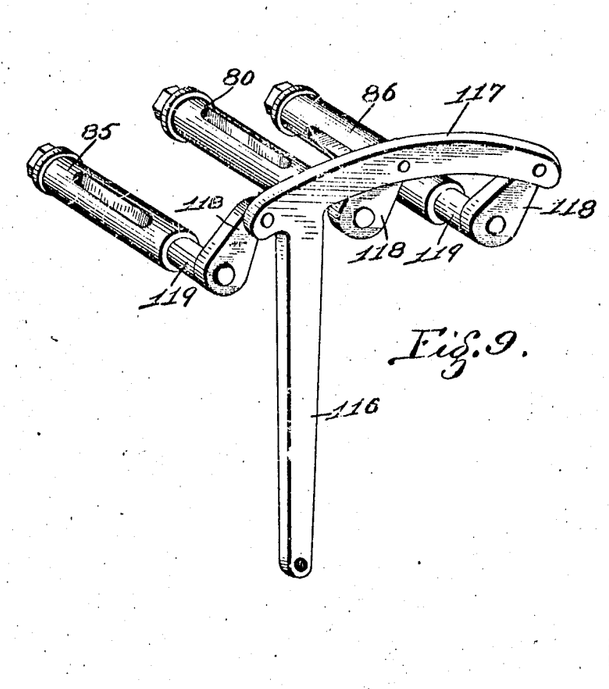
Fig. 9 is a detail perspective view of the valves used for admitting steam into the cylinder and governing the direction of the movement.
Figures 10, 11:
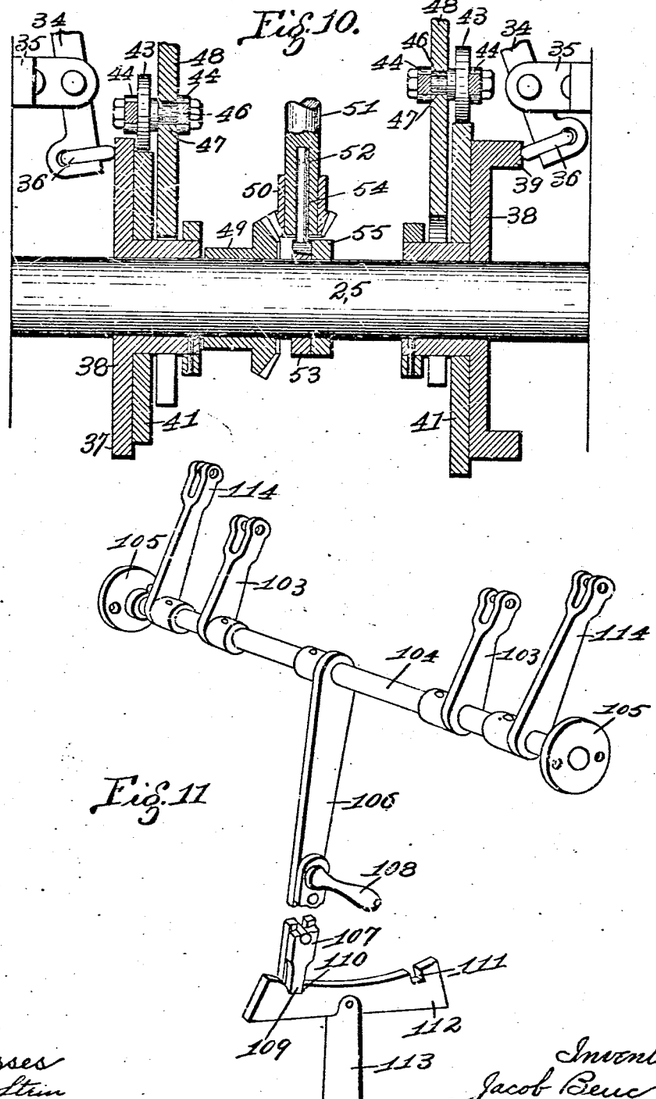
Fig. 10 is an enlarged sectional view of the cams made use of in operating the valve and abutment mechanism.
Fig. 11 is a detail perspective view of the shifting mechanism, used for reversing the movement of the engine.
Figure 12:
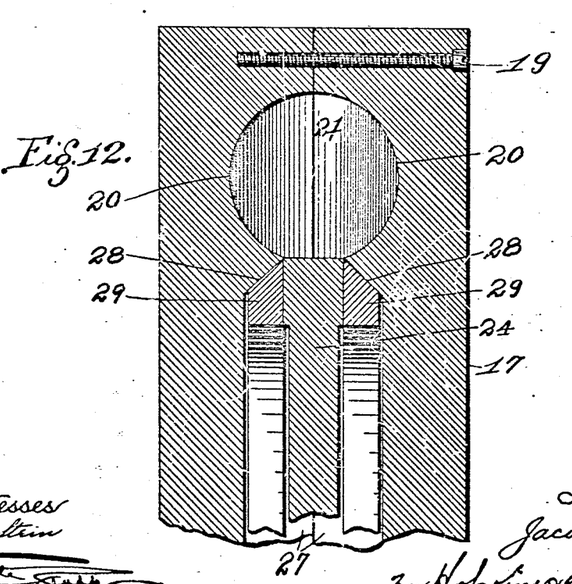
Fig. 12 is an enlarged detail cross section of one of the cylinders.

The lever 106 is provided with a sliding pawl 107 to which is attached a handle 108 by which said pawl is raised and lowered, permitting its tooth 109 to engage with the recesses 110 and 111 formed in the plate 112 supported on a post 113, held in upright position on the base of the engine. By this mechanism the position of the valves is shifted so as to place the engine in reverse motion, and when the lever 106 is placed in a position so that the tooth 109 registers with the recess 111, the roller 43 is brought in a position opposite to that shown in Fig. 7, so that the cam projection 42 may contact with the roller to manipulate the valve 74, at the proper period, cutting off the live steam. Upon the shaft 104 are also located arms 114, their free ends attached to the connecting rods 115, the opposite ends of said connecting rods being pivotally connected to an arm 116 which projects downwardly and forms a part of the segments 117, to said segments is pivotally connected one end of the cranks 118, the opposite end of said cranks attached to the valve stems 119 of the valves 80, 85 and 86, and by the shifting of the lever 106 the valves 80, 85 and 86 are partially rotated, shifting the position of the ports, which ports will register with the ports in the cylinders, admitting the steam into the passage 21.

Figure 1:
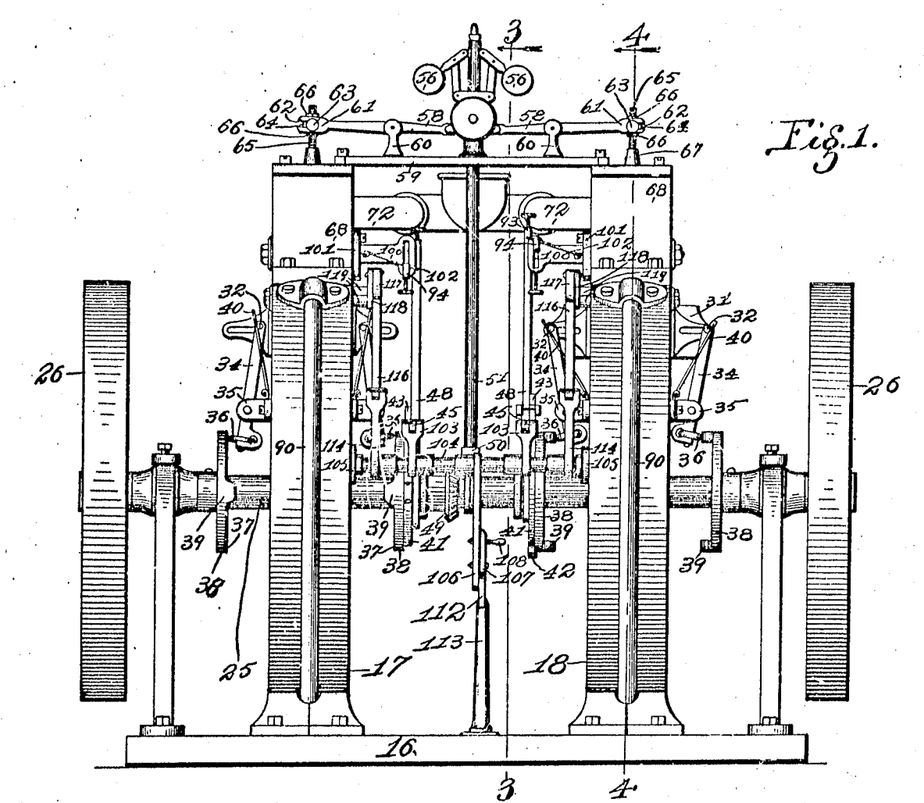
Figure 1 is a front view of my complete invention.
Figure 2:
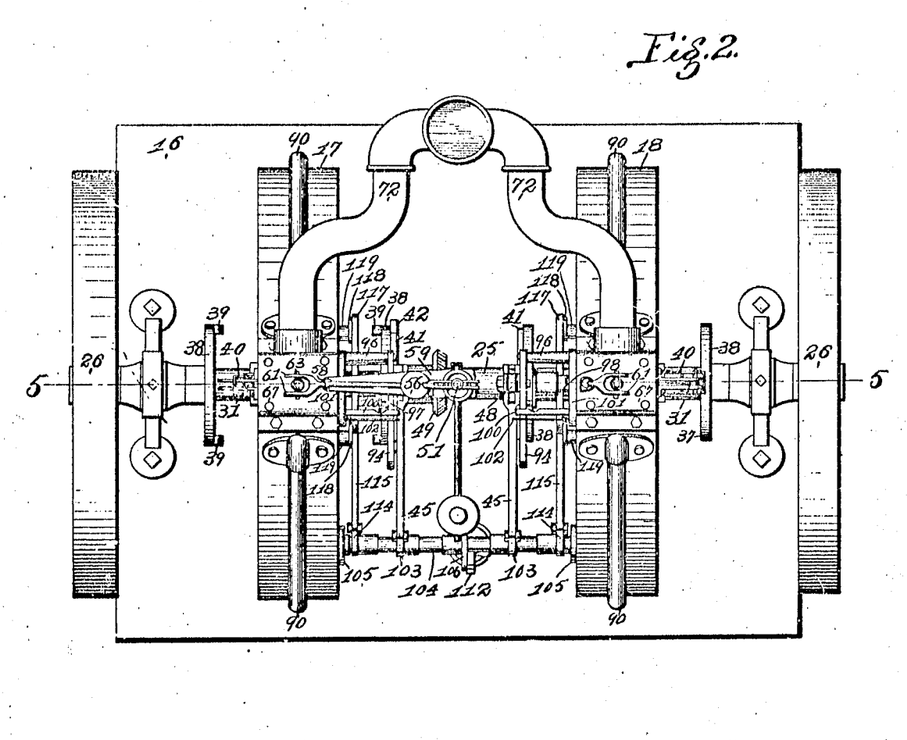
Fig. 2 is a top plan view of the same.
Figure 3:
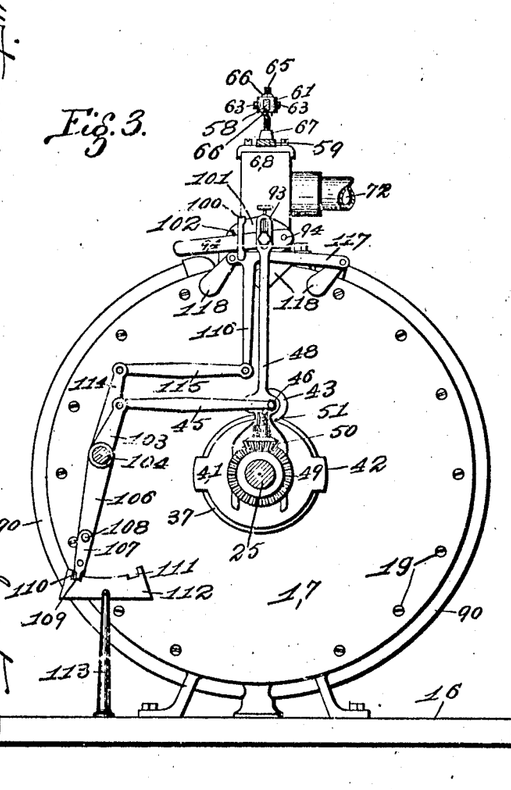
Fig. 3 is a central sectional view, taken on the line 3—3 of Fig. 1.
Figure 4:
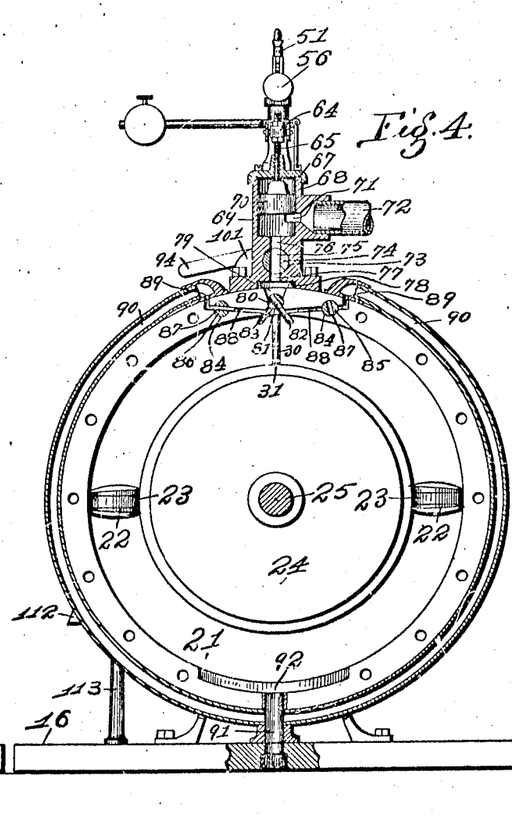
Fig. 4 is a central sectional view of one of the cylinders taken on the line 4—4 of Fig. 1.
Figure 5:
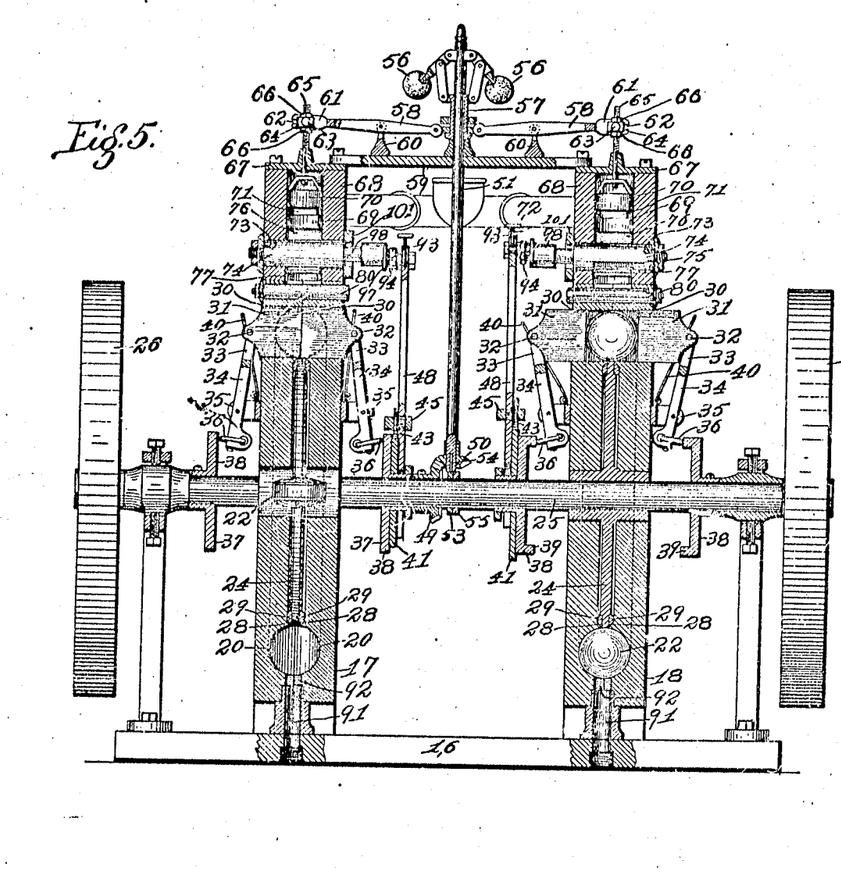
Fig. 5 is a vertical central sectional view, taken on the line 5—5 of Fig. 2.

Referring to Fig. 4, the position of the ports is such as to permit the engine to rotate in the direction indicated by the arrows in the passage 21, and as the pistons are traveling and are nearing the abutments 31, the position of the cams 38 is such that the projections 39 contact with the rollers 36, which will operate the levers 34, withdrawing the abutments 31, permitting the pistons to pass and immediately after the pistons have passed, the abutments 31 instantly close forming a division wall, and the live steam is admitted into the space between the piston and the abutment, through the ports 81 and 82. The exhaust passes out through the exhaust port 91 at the bottom, and the air within the cylinder or such portion of the exhaust which might have remained in the cylinder, is discharged through the port 83 and 88, and into the pipe 90.

To reverse the engine, the valves are shifted so that the ports register opposite to that shown in Fig. 4, this will then admit the live steam on the opposite side of the abutments. Should the engine vary in its speed, the live steam is checked from passing through the ports by the governor mechanism, which operates the valves 70, forcing them downwardly cutting off the ports 71.

The position of the cams on the shaft is such that at the moment the abutments are moved outwardly, the valve 74 is operated, cutting off the live steam, thus preventing any admission of steam into the cylinders while the pistons are passing the abutments.

Each cylinder is provided with two pistons, the pistons in one cylinder being located at quarters to the pistons in the opposite cylinder. The object of this is to provide a continuous pressure, thus preventing lost motion and dead centers.

Having fully described my invention what I claim is:

1. A device of the class described, comprising a pair of cylinders, each composed of two sections, a driving shaft extending through said cylinders, disks mounted upon said shaft and located between the sections forming the cylinders, pistons located on said disks, a plurality of valves rotatably mounted in said cylinders, steam chests mounted on each of said cylinders, a rotary valve located in each of said steam chests for regulating the admission of steam into the cylinders, a governor valve located in each of said steam chests for regulating the admission of steam and means for operating all of said valves, substantially as specified.

2. A rotary engine comprising a base, a pair of cylinders mounted on said base, each of said cylinders composed of two sections centrally divided, a driving shaft extending through said cylinders, a disk located on said driving shaft and operating intermediate of the sections forming the cylinder, a pair of pistons carried by the disks and operating in a piston passage formed by the cylinder sections, a sliding abutment operating through each of said cylinders in alinement with the piston passage, levers connected to said abutments, cams located on the driving shaft for operating the levers to manipulate the sliding abutments, a plurality of rotary valves located in the cylinders for regulating the steam to be admitted into the piston passage between the abutment and piston, means for operating said valves and a means for shifting the position of said valves for regulating the movement of the engine, substantially as specified.

3. A device of the class described comprising a pair of cylinders mounted on a base, a driving shaft extending centrally through said cylinders each of said cylinders composed of two sections each provided with a curvilineal groove which forms a piston passage, a disk mounted upon the shaft and located between said sections, a pair of pistons carried by the disk and operating in the piston passage, a steam chest mounted on each of said cylinders, a rotary valve and a governor valve located in said steam chest, a plurality of rotary valves located in said cylinders intermediate of the steam chest and piston passage, a pair of sliding abutments operating through each of said cylinders, a lever mechanism for manipulating said abutments for opening the passage to permit the pistons to pass and immediately close the same thereafter, a plurality of cams located on the driving shaft for operating the lever mechanism and the valves and a governor for controlling the admission of steam, substantially as specified.

In testimony whereof, I have signed my name to this specification, in presence of two subscribing witnesses.

JACOB BEUC.

Witnesses:
ALFRED A. EICKS,
WALTER C. STEIN.